Patented May 29, 1951

2,554,871

UNITED STATES PATENT OFFICE 2,554,871

CONCENTRATED OLIVE EXTRACTIVES AND METHOD OF PRODUCING SAME

Sidney Musher, New York, N. Y., assignor to Musher Foundation Incorporated, New York, N. Y., a corporation of New York No Drawing. Application September 4, 1948,
Serial No. 47,949

25 Claims. (Cl. 99—140)

The present invention relates to a process of making a water white, water soluble olive oil flavor, the flavor of which is also oil and fat soluble and which is made at low cost and by simple and economical methods.

Olives and olive oil have both been extensively used as relatively expensive food ingredients and their value is largely determined by the uniqueness of their flavor. It has not been possible to provide real olive oil flavor at a reasonable cost and under conditions of broad usage with aqueous compositions.

It is an object of the present invention to provide a concentrated, highly desirable olive oil flavor in water white, water soluble condition, free of objectionable color and taste characteristics and having an intensified, desirable and clean olive oil flavor.

A further object is to provide an olive oil flavor at low cost that may be used in the manufacture of various food products particularly mayonnaise and salad dressings, French dressing, and other foods and which olive oil flavor is made from material which is normally discarded or serves only as residue material.

A further object is to provide such an intensified olive oil flavor which combines water and fat soluble flavoring constituents, the flavor constituent of which may readily be imparted to other fats and oils.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedure of the present invention, fresh olives as removed from the olive trees and desirably in ripe condition are placed into a brine solution in order to allow the olives to cure while at the same time apparently an enzymic reaction takes place while the olives are held in the brine, producing a particular type of brine from these olives.

This brine which is drained from these olives after the reaction or curing has taken place is then subjected to a distillation procedure and the distillate thus obtained is water white and has a clean and highly desirable olive oil flavor and aroma, which product has unusual characteristics when employed in the manufacture of a variety of food products.

This water white distillate is free of the impurities, coloring matter and objectionable flavor and aroma constituents of the original brine and surprisingly contains not only water soluble constituents but also contains preferentially oil and fat soluble constituents.

The brine may be distilled directly into refined deodorized oil in order to develop the flavor in the oil by the distillation procedure, leaving the oil solubles of the brine in the oil, followed by separation of the aqueous fraction. The distillation may also be conducted by fractional distillation of the brine or high vacuum distillation of the brine may be resorted to in order to obtain a fraction which is high in olive oil flavor and the fraction thus obtained high in flavor may be admixed with the oil leaving the oil solubles in the oil and with removal of the water solubles or brine solubles free of the oil solubles.

For example, the brine removed from the fully cured ripe olives may be subjected to a vacuum distillation such as by heating the brine under reduced pressure and within a temperature range of, for example, between 30° C. and 70° C. or by distilling at atmospheric pressures and at higher temperatures of up to or over 100° C.

The distillate separated from the fully cured, ripe olive brine may also be thoroughly agitated with a refined vegetable oil such as refined corn oil, refined cottonseed oil, etc., all of which are desirably in deodorized condition and have little or no flavor of their own, during which agitation process the oil soluble fraction contained in the distillate is transferred into the oil and the distillate freed of the oil solubles may then be separated from the oil. The oil thus obtained has a most pronounced and highly desirable, clean and fresh, as well as lasting olive oil aroma and flavor.

The distillation may be conducted until anywheres from 50% to 85% and preferably from 30% to 60% of the distillable materials of the brine are removed. To the distillate there may be added preservative materials such as salt, vinegar, acetic or other acid, benzoate of soda or other material in order to hold the distillate in satisfactory condition until ready for ultimate use. It is particularly desirable to add common salt to the distillate in an amount of about 5% to 15% by weight while the distillate is awaiting ultimate use.

The distillate of the olive brine may also be used in the manufacture of a mayonnaise or salad dressing or French dressing (referred to herein broadly as salad dressings) to replace part or all of the aqueous fraction of the mayonnaise or salad dressing. The water white distillate will provide in the mayonnaise, salad or French dressing highly desirable olive oil flavor characteristics without any of the objectionable features of the original brine and of a greater intensity and greater desirability than olive oil.

The following are typical examples of the preperation of olive brine distillates:

Example A 216 grams of brine removed after curing ripe olives in common salt brine for 12 months were distilled under vacuum, catching the distillate in an iced receiver. 10% of salt was added to the distillate. This run was stopped when the brine being distilled was saturated with salt. The following are taken from laboratory notes.

Pressure, 8.6 cm. Hg abs.
Dist., 119.6 gr.—55.3%
Loss, 12.2 gr.—5.64%
Temp., 37.5–51° C.
Residue, 84.2 gr.

Example B 540 grams of the same brine as that used in Example A were steam distilled under vacuum, catching the distillate in an iced receiver. 10% of salt was added to the distillate. This run stopped when about 500 cc. of the distillate was recovered.
Pressure, 25 cm. Hg. abs.. Temp., 85° C..

Example C 191 grams of the same brine as that used in Example A were distilled under vacuum as in Example A. However, distillation was continued until considerable precipitation had occurred in the original brine being distilled with the following results:

Pressure, 5.6 cm. Hg abs.
Dist., 131.9 gr.—69%
Loss, 3.2 gr.—1.68%
Temp., 35–65° C.
Res., 55.9 gr.

In the case of each of the tests conducted above, the water white distillate was found highly desirable for use in the manufacture of mayonnaise or salad dressing or for admixture with a refined vegetable oil in connection with the procedures herein set forth.

The distillation of the olive brine may where desired be conducted at atmospheric pressure and the distillate, particularly the first 30% to 40% of the original material, will have a highly concentrated olive flavor and aroma characteristic.

The brine used for distillation procedure is most desirably that brine which is removed from ripe olives that have been fully and completely cured. For example, ripe olives as removed from the tree are held in a sodium chloride brine solution for a period of at least about 6 months in order to allow the olives to cure completely while at the same time an enzymatic reaction takes place upon the olives producing a particular type of brine from these enzyme activated olives, which brine has been found to be highly desirable for distillation purposes in accordance with the procedures set forth herein.

Any variety of ripe olives may be used for the brining or curing procedure. For example, ripe olives of the Manzanilla, Mission, Sevillano, or Escalano variety may be employed or ripe olives as produced in the Mediterranean districts including those from Italy, Greece, Spain, Tunis or other parts of Africa may be employed.

The ripe olives when taken from the trees are held in a sodium chloride brine solution of desirably at least about 35° to 40° salometer reading and preferably a salometer reading of 45° to 55°. The olives, for example, may be placed into barrels with the bung of the barrel held loosely on the top to permit the curing and enzyme reaction to take place and every three or four days, particularly at the beginning of the brining process, the brine is tested for salometer reading and sufficient additional salt is added to maintain the salometer reading at the desired level, preferably at 45° to 55° reading.

These ripe olives are held in the brine for a period of about 6 months under normal temperature conditions. At the close of this period, the ripe olives will have become fully and completely cured, leaving a brine in which the olives are held that has the most desirable characteristics for use in accordance with the procedures of the present invention.

The ripe olives may be held in the brine for a longer period than 6 months and the brine of ripe olives cured for a year to 18 months is even more desirable. The time period herein specified is based upon holding the olives under about normal room temperature conditions. Where the olives are held at slightly higher temperatures as for example at 85° F. to 95° F. the time period may be shortened somewhat.

The olives should not be subjected to a sufficienty elevated temperature treatment prior to the curing which would inactivate or kill the enzymes. For example, the ripe olives should not be boiled or heated to a temperature of 180° F. or more as if the olives are subjected to an elevated temperature treatment either in the brine or before brining and before the enzyme reaction has taken place, the enhanced olive flavor of the present invention is not obtained.

Where desired although as a less preferable procedure, the olives as removed from the trees as in semi-ripe condition may be subjected to a lye treatment as, for example, by placing in a 1.25% sodium hydroxide solution for a period of several hours or more with aeration. The olives may then be soaked in water without sodium hydroxide or in slightly acidified water, changing three times daily until the lye is thoroughly removed, normally requiring from six to seven days. The brine from olives treated in this manner may then be utilized for distillation procedures as herein set forth.

Where it is desired to start with brine of green olives for distillation, the olives may be soaked in a dilute lye solution as, for example, about 1½% to 2% sodium hydroxide solution for a period of several days followed by washing the olives with plain or slightly acidified water to remove the lye and then storing the olives in a brine of about 8% to 11% salt concentration for a period of 1 to 3 months or more. During this period a lactic acid type of reaction takes place. After the olives have been thoroughly cured the brine of these cured green olives may be utilized for distillation in accordance with the manner herein described.

In the case of the fully cured ripe olives which have been held in the brine for a period of at least about six months, where these olives themselves are expressed to remove two fractions, namely, an oil fraction and an aqueous or brine fraction, the aqueous or brine fraction thus expressed may be used for distillation in accordance with the procedures herein described. Generally, however, only the brine in which the olives have been allowed to cure is employed.

The concentrated olive oil flavor thus obtained in the form of a water white aqueous composition may be used for many purposes, particularly in the manufacture of mayonnaise, salad dressing and French dressing and in the preparation of salads including fish salad, chicken salad, cole slaw and potato salad as well as condiments, sauces and the like.

For example, between about 2% and 40% of the distillate thus obtained may be added to a food composition such as to mayonnaise, salad dressing or French dressing. Preferably between about 10% and 20% of the distillate is employed. The distillate may be utilized in the mayonnaise or salad dressing formula in lieu of water and the resultant product will have an intensified olive oil flavor and aroma without any of the objectionable characteristics that would be obtained with the use of the original brine or by the use of olive oil and will also give more intensified flavor.

Furthermore, as a result of the procedures of the present invention the distilled olive brine employed gives a very much more pronounced olive oil flavor than can be obtained by an identical amount of olive oil. In other words, in a salad dressing to which 10% of the distilled olive brine separated from fully cured ripe olives is added, the olive oil taste is very much more pronounced than where 10% of pure olive oil is added to the same salad dressing.

As an example, the following typical formula of salad dressing was employed:

| | Pounds |
|---|---|
| Water | 13½ |
| Salt | ½ |
| Sugar | 3½ |
| Vinegar | 4 |
| Cornstarch | 3 |

The above was heated to 185° F., allowed to cool and combined with the following:

| | |
|---|---|
| Egg yolk | 2½ lbs. |
| Sugar | 14 oz. |
| Salt | 5 oz. |
| Refined cottonseed oil | 17½ lbs. |
| Water | 3 lbs. |
| Vinegar | 1 lb. 3 oz. |
| Dry mustard | 2 oz. |

To the above salad dressing was added 5 pounds of the distillate obtained by distilling at atmospheric pressure the brine removed from ripe olives which had been curing in the said brine for a period of nine months. The distillation was continued until 60% of the original brine had been distilled off and this distillate was used in the amount of five pounds to the addition of the aforementioned salad dressing formula.

The resultant salad dressing had a pronounced olive oil taste and flavor and did not carry the oiliness normally carried by olive oil nor was it subject to the rancidity to which olive oil is normally subject.

For comparative purposes the same typical salad dressing formula was prepared and to that formula was added five pounds of pure olive oil. The resultant product had a distinct oily or greasy taste but had practically no olive oil flavor and was in no way comparable to the olive oil flavor characteristics of the salad dressing prepared with the distilled olive brine.

In the distillation of the olive brine, where desired either the first distillate fraction constituting up to 20% to 25% of the olive brine may be utilized or the distillation may be continued until 50% to 60% or more of the olive brine has been distilled off.

Where the amount of salt in the original brine makes distillation difficult after the removal of the first 40% of the brine, additional water can be added to the undistilled fraction and distillation may be continued until the brine being distilled is entirely free of flavor and aromatic characteristics or until, for example, about 60% to 80% of the original brine has been distilled.

The distilled olive brine has also been found to be of value in the preparation of French dressings and salad dressing other than the usual types made with a 35% to 50% oil content. For example, the distilled olive brine may be employed in the preparation of an oil-less salad dressing or of a low calorie salad dressing such as one composed of water, cider vinegar, cornstarch, locust bean gum, egg yolk, sugar, salt, mustard and with or without other gums such as gum tragacanth, sodium carboxy methyl cellulose, etc., and with or without a small amount of vegetable oil and/or vegetable shortening.

It it also possible to have the olives cured and at the close of the curing operations to press out the olives whereby there is obtained a brine fraction resulting from the aqueous materials contained within the cured olives and an oil fraction. The oil fraction may be sold as olive oil and the brine as well as the aqueous fraction expressed from the cured olives may be employed for distillation procedures as herein set forth.

The present invention is a continuation in part of application Serial No. 720,319, filed January 4, 1947, entitled "Olive Brine Treated Food Glyceride Oils," now abandoned, and application Serial No. 786,164, filed November 14, 1947, entitled "Fully Cured Olive Brine Treated Food Glyceride Oils."

Having described my invention, what I claim is:

1. A water white aqueous extract of the brine of fully cured olives.

2. A water white aqueous composition separated from the brine of fully cured olives carrying olive oil flavor.

3. A water white olive brine distillate separated from the brine of fully cured olives.

4. A water white water soluble olive distillate separated from the brine of fully cured olives.

5. The distillate of the brine of fully cured olives, said distillate carrying olive oil flavor.

6. A water white olive flavored aqueous composition derived and separated from the brine of fully cured ripe olives.

7. A method of making a water white aqueous composition carrying olive flavor which comprises subjecting the brine of fully cured olives to distillation.

8. A method of making an olive flavored water white aqueous composition which comprises distilling the brine of fully cured ripe olives.

9. A method of making a water white olive flavored aqueous composition which comprises subjecting ripe olives to brine curing for a period of at least about six months, separating the brine, and then distilling the said brine, the distillate thereof carrying the intensified olive flavor.

10. A food composition comprising as an ingredient a small amount of the distillate of the brine of fully cured olives.

11. A salad dressing composition carrying as an ingredient a small amount of the distillate of the brine of fully cured olives.

12. A salad dressing composition carrying as an ingredient a small amount of a water white olive distillate separated from the brine of fully cured olives.

13. A salad dressing composition carrying as an ingredient a small amount of the distillate of the brine of fully cured ripe olives.

14. The distillate obtained by subjecting the brine of fully cured ripe olives to vacuum distillation.

15. The water white distillate derived by distillation from the brine of fully cured ripe olives.

16. A water white aqueous composition carrying concentrated olive flavor, said composition being distilled from the brine of fully cured ripe olives.

17. A water white aqueous composition carrying the concentrated flavor of the brine of the fully cured olives.

18. A method of making an olive oil flavored water white aqueous composition which comprises placing ripe olives in a sodium chloride salt solution for at least six months, said salt solution being maintained at a salometer reading of between 35° and 45°, separating the brine from the olives at the close of the curing period, and then distilling the said brine, the distillate thereof carrying the intensified olive flavor.

19. A method of making an olive oil flavored water white aqueous composition which comprises placing ripe olives in a sodium chloride salt solution for a period of between 1 year and 18 months, said salt solution being maintained at a salometer reading of between 35° and 45°, separating the brine from the olives at the close of the curing period, and then distilling the said brine, the distillate thereof carrying the intensified olive flavor.

20. A method of making an olive oil flavored water white aqueous composition which comprises placing ripe olives in a sodium chloride salt solution for at least six months at a temperature of between about 85° F. and 95° F., said salt solution being maintained at a salometer reading of between 35° and 45°, separating the brine from the olives at the close of the curing period, and then distilling the said brine, the distillate thereof carrying the intensified olive flavor.

21. A method of making an olive flavored water white aqueous composition which comprises placing ripe olives in a sodium chloride salt solution for at least six months, said salt solution being maintained at a salometer reading of between 35° and 45°, separating the brine from the olives at the close of the curing period, and then distilling the said brine in a refined vegetable oil.

22. A method of making an olive oil flavored water white aqueous composition which comprises placing ripe olives in a sodium chloride salt solution for at least six months, said salt solution being maintained at a salometer reading of between 35° and 45°, separating the brine from the olives at the close of the curing period, and then distilling the said brine to remove between about 50% and 85% of distillable material, the distillate thereof carrying the intensified olive flavor.

23. A method of making an olive oil flavored water white aqueous composition which comprises placing ripe olives in a sodium chloride salt solution for at least six months, said salt solution being maintained at a salometer reading of between 35° and 45°, separating the brine from the olives at the close of the curing period, distilling the said brine, adding to the distillate a preservative, the said distillate and preservative carrying the intensified olive flavor.

24. A method of making a water white olive flavored aqueous composition which comprises placing ripe olives in a common salt brine solution for curing for a period of about 12 months, separating the brine from the olives at the close of the curing period, subjecting the brine to vacuum distillation, adding to the distillate 10% of salt, said distillate containing the salt carrying the intensified olive flavor.

25. A method of making an olive flavored salad dressing which comprises placing ripe olives in a sodium chloride salt solution for at least six months, said salt solution being maintained at a salometer reading of between 35° and 45°, separating the brine from the olives at the close of the curing period, distilling the said brine and adding between 2% and 40% of the distillate to the salad dressing to develop in the salad dressing a pronounced olive oil flavor and taste.

SIDNEY MUSHER.

REFERENCES CITED

The following references are of record in the file of this patent:

UNITED STATES PATENTS

| Number | Name | Date |
| --- | --- | --- |
| 2,221,404 | Musher | Nov. 12, 1940 |
| 2,411,201 | Forkner | Nov. 19, 1946 |